United States Patent
Kolganov et al.

(10) Patent No.: US 10,593,433 B2
(45) Date of Patent: Mar. 17, 2020

(54) DEVICE FOR SECURING A BLANKET MODULE TO A FUSION REACTOR VACUUM VESSEL

(71) Applicant: STATE ATOMIC ENERGY CORPORATION "ROSATOM" ON BEHALF OF THE RUSSIAN FEDERATION, Moscow (RU)

(72) Inventors: Vladimir Ur'evich Kolganov, Moscow (RU); Sergey Emil'evich Khomyakov, Moscow (RU); Ivan Igorevich Poddubnyj, Moskovskaya Obl. (RU)

(73) Assignee: State Of Atomic Energy Corporation "Rosatom" On Behalf Of The Russian Federation (RU)

( * ) Notice: Subject to any disclaimer, the term of this patent is extended or adjusted under 35 U.S.C. 154(b) by 0 days.

(21) Appl. No.: 16/087,027

(22) PCT Filed: Mar. 20, 2017

(86) PCT No.: PCT/RU2017/000154
§ 371 (c)(1),
(2) Date: Sep. 20, 2018

(87) PCT Pub. No.: WO2017/164775
PCT Pub. Date: Sep. 28, 2017

(65) Prior Publication Data
US 2019/0122772 A1   Apr. 25, 2019

(30) Foreign Application Priority Data
Mar. 21, 2016 (RU) ................................ 2016110190

(51) Int. Cl.
*G21B 1/13* (2006.01)
*G21B 1/17* (2006.01)

(52) U.S. Cl.
CPC ................. *G21B 1/13* (2013.01); *G21B 1/17* (2013.01); *Y02E 30/128* (2013.01)

(58) Field of Classification Search
CPC .................................... G21B 1/13; G21B 1/17
(Continued)

(56) References Cited

U.S. PATENT DOCUMENTS

| | | |
|---|---|---|
| 2002/0172316 A1 | 11/2002 | Matera et al. |
| 2006/0045650 A1 | 3/2006 | Donovan |
| 2017/0057651 A1 | 3/2017 | Husband |

FOREIGN PATENT DOCUMENTS

| | | |
|---|---|---|
| JP | 2004-239807 A | 8/2004 |
| RU | 102828 U1 | 3/2011 |

(Continued)

OTHER PUBLICATIONS

International Search Report issued in corresponding International Application No. PCT/RU2017/000154, dated Aug. 17, 2017, 3 pages, (with English Translation).

*Primary Examiner* — Jack W Keith
*Assistant Examiner* — Daniel Wasil
(74) *Attorney, Agent, or Firm* — Eric L. Sophir; Dentons US LLP

(57) ABSTRACT

The invention relates to the field of thermonuclear fusion and can be used for securing a blanket module to a vacuum vessel of a fusion reactor. The connecting device comprises a flexible support in the form of rods mounted between an upper flange having a concave spherical surface and a lower flange; a displacement compensator mounted on the upper flange; and a male-threaded locknut. The displacement compensator is fixedly connected to the blanket module and comprises a locking screw and a supporting sleeve, which are pivotally interconnected, a spacer sleeve, and a coupling sleeve with a spherical protuberance. The spacer sleeve is movably connected to the locking screw and pivotally (Continued)

connected to the upper flange of the flexible support and to the spherical protuberance of the coupling sleeve. The coupling sleeve is fixedly connected to a stop surface of the locknut.

6 Claims, 1 Drawing Sheet

(58) Field of Classification Search
USPC .................................................. 376/121, 136
See application file for complete search history.

(56) References Cited

FOREIGN PATENT DOCUMENTS

| | | |
|---|---|---|
| RU | 2491663 C1 | 8/2013 |
| RU | 2563975 C1 | 9/2015 |

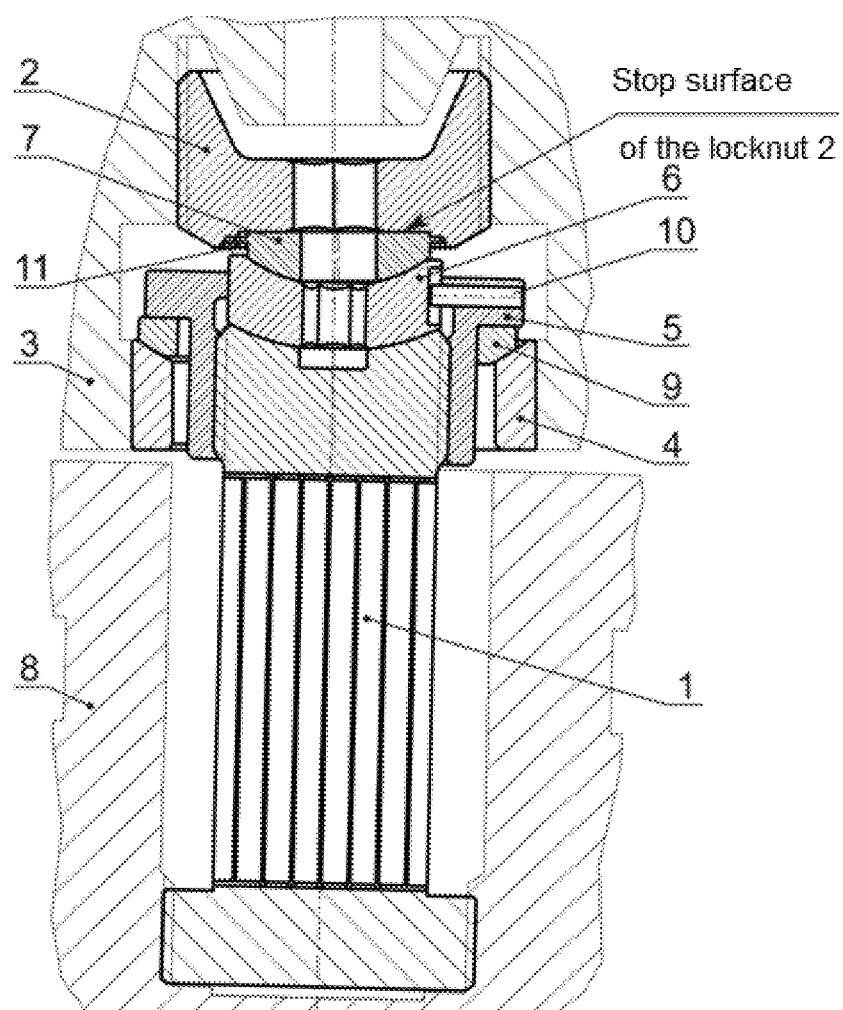

DEVICE FOR SECURING A BLANKET MODULE TO A FUSION REACTOR VACUUM VESSEL

CROSS-REFERENCE TO RELATED APPLICATIONS

This application is a National Stage of PCT/RU2017/000154, filed Mar. 20, 2017 that claims the priority of Russian Patent Application No. 2016110190, filed on Mar. 21, 2016, which are incorporated herein by reference in their entirety for all purposes.

TECHNICAL FIELD

The invention relates to the field of thermonuclear fusion and can be used in devices for securing a blanket module to the vacuum vessel of a fusion reactor.

BACKGROUND ART

There is known a device for securing a blanket module to a vacuum vessel of a fusion reactor comprising flexible hollow support designed in the form of rods mounted between two flanges, wherein one of the flanges couples the support with the vacuum vessel and the other flange is connected with the blanket module by means of a threaded fastener with a locking sleeve fixed in the blanket module by deformation (Russian Patent No. 2563975, IPC G21Bl/17, published on Sep. 27, 2015).

The known device comprises the threaded fastening member being a screw bolt having a head located in the cavity of the flexible support and a threaded part fixed in a threaded hole of the module. The locking sleeve is made from two separate elements rigidly interconnected along a tapered surface. One of the said elements is made in a form of a rod with a head matching with the hole in the end face of the screw bolt threaded portion, wherein the end portion of this element is tapering. The second element is configured in the form of a sleeve having a hole with a conical section matching the tapered end portion of the first element. The end portion of the sleeve is configured thinwalled and having an outer diameter greater than the outer diameter of the remaining portion of the sleeve. The locking sleeve is mounted with the head of the first element in a screw bolt mounting hole and fixed in the module by deformation of the thinwalled end portion of the second element located in the hole of the module. The screw bolt can be fixed directly in the module or connected to it by a plug nut having an outer conical surface mating with a cone sleeve forming a threaded connection with the module.

The known device for securing the blanket module to the vacuum vessel of the fusion reactor has a disadvantage that additional machining of the flexible support is required along its length to compensate angular and shear displacements arising from manufacturing errors of the vacuum vessel during assembling process of the module. Additional machining is carried out during the installation process and should be accompanied by constant measurements of the flexible support significantly extending and complicating the mounting operations.

The closest analog to the claimed invention as to the essential features is a device for securing a blanket module to the vacuum vessel of the fusion reactor comprising flexible support in a form of rods located between two flanges, and a displacement compensator mounted by threaded joint on the flange of the support oriented towards the module, said displacement compensator is comprised of a locking screw and supporting sleeve, which are pivotally interconnected, and a coupling sleeve with a spherical protuberance (convex surface), the coupling sleeve connecting the flexible support with the blanket module via a threaded fastener (Russian Patent No. 2491663, IPC G21Bl/13, published on Aug. 27, 2013).

In the indicated device the rods of the flexible support are mounted around the periphery of the flanges forming a cavity in the central part of the flexible support. The threaded fastener is configured in a form of a screw bolt having a head located in the cavity of the flexible support and a rod part passing through the openings in the elements of the displacement compensator and engaging the module with a thread. A flange of the support oriented towards the module is threadably connected to the locking screw of the displacement compensator. The locking screw is configured to have a convex spherical surface, and the supporting sleeve has a complementary concave spherical surface. The coupling sleeve is located to provide a contact with the surfaces of the module and the surfaces of the supporting sleeve, the supporting sleeve is coupled by the spherical protuberance with a cone-shaped recess in the mounting hole of the module. A ball washer is provided between the bolt head and the flange of the flexible support oriented towards the module, wherein the inner surface of the bolt head interfaced with the washer is configured to have a complimentary spherical shape.

Installation of the known device is carried out as follows.

The screw bolt and the ball washer are inserted into the hollow flexible support, the support is then positioned in the mounting socket of the vacuum chamber. A locking screw having a convex spherical outer surface is threadably mounted on the flange of the flexible support oriented towards the blanket module in such a way that the bolt rod extends beyond the flexible support. A supporting sleeve with a concave spherical inner surface is mounted on the locking screw with a convex spherical outer surface. A coupling sleeve with a spherical protuberance is mounted on the threaded end of the screw bolt to align the end faces of the coupling sleeve and the supporting sleeve. The blanket module is positioned on the assembled device in such a way that the conical recess of the module abuts the spherical protuberance of the coupling sleeve.

The known device ensures compensation of the angular and shear displacements arising during the mounting process. In case of a shear (lateral) displacement the coupling sleeve moves over a displacement value thus accommodating possible lateral displacement. In case of an angular displacement, the screw bolt, the supporting sleeve and the coupling sleeve rotate by the value of such angular displacement, thus accommodating the angular displacement, and the axis of the screw bolt is aligned with the axis of the mounting hole.

The bolt is then screwed in using a special tool installed into the mounting hole in the rod portion of the bolt, and the ball washer is automatically installed due to engagement with the spherical surface of the bolt head.

The known device for securing the blanket module to the vacuum vessel of the fusion reactor as described above has a disadvantage that the threaded connection between the bolt and the blanket module is weakened in the process of cycle operation of the fusion reactor. This can be accounted for by the absence of stop elements which cannot be used due to hindered access to the threaded connection caused by spatial restrictions in its location. In addition, another disadvantage of the known device can be defined as the limitation of the permitted torque value for the threaded connection of the flexible support and blanket module due to small cross-section area of the rod portion of the bolt caused by the inner mounting hole.

SUMMARY OF THE INVENTION

An object of the present invention is to provide a device for securing a blanket module to a fusion reactor vacuum vessel which ensures service reliability in the process of cycle operation of the fusion reactor, as well as streamlining the process of installation of the blanket module on the vacuum vessel.

The technical effect of the present invention is an increase in permitted torque value of the threaded joint between the flexible support and the module, which increases a load-support capacity of the device, prevents possible weakening of the threaded joint by virtue of self-locking ability, and provides for self-compensation of angular and axial displacements occurring as the module is mounted on the vacuum vessel.

The indicated technical effect is achieved by means of modification of the known device for securing the blanket module to the fusion reactor vacuum vessel, said device comprising a flexible support in the form of rods that are mounted between two flanges, a displacement compensator threadably mounted on that flange of the flexible support which is oriented towards the blanket module (is closer to the blanket module), wherein the displacement compensator comprises a locking screw and a supporting sleeve pivotally connected to each other, and a coupling sleeve with a spherical protuberance. The flexible support is coupled to the blanket module by a coupling sleeve through a fastener. According to the present invention, the threaded fastener is a locknut with a male thread, and the flange of the flexible support oriented towards the blanket module has a concave spherical surface. The displacement compensator is rigidly connected to the blanket module and is provided with a spacer sleeve, which is movably connected to the locking screw and has a convex spherical surface and a concave spherical surface forming a pivot connection with the said flange and with the spherical protuberance of the coupling sleeve. The coupling sleeve is rigidly connected to a stop surface of the locknut.

In one embodiment, the rigid connection of the displacement compensator with the module is made by means of self-locking threaded connection of the supporting sleeve side surface to the module.

In one embodiment, the rigid connection of the displacement compensator with the module is made using a welded seam of the supporting sleeve side surface to the module.

In one embodiment, the flexible connection of the spacer sleeve with the locking screw is made as a splined joint.

In one embodiment, the rigid connection of the coupling sleeve with the stop surface of the locknut is made using a flexible fixing ring.

In one embodiment, the rigid connection of the coupling sleeve with the stop surface of the locknut is made using a fixing ring and a welded seam.

Making the threaded fastener as a locknut and the rigid connection of the displacement compensator with the module prevents possible weakening of the threaded joint during operation of the fusion reactor by virtue of self-locking ability. Replacing the bolt with the locknut enables to increase the load-support capacity of the device by virtue of increasing the diameter of the fastening thread, which allows to increase tension of the threaded connection between the flexible support and the blanket module and, therefore, to increase the permitted loads received from the blanket module with a guaranteed non-gapping of the joints. Furthermore, by means of eliminating the bolt component (replacing the bolt with the locknut) a space for the spacer sleeve became available, and the spacer sleeve provides for a pivot joint of the flexible support with the displacement compensator, provides for a flexible joint with a locking screw and a flexible joint of the coupling sleeve with relation to a locknut. The above configuration enables self-compensation of angular and axial displacements occurring as the module is mounted on the vacuum vessel.

The essential features described above as compared to the closest analog result in the reliable operation of the device for securing the module to the vacuum vessel in the severe conditions in the fusion reactor and facilitate installation works during mounting process.

BRIEF DESCRIPTION OF THE DRAWINGS

The essence of the present disclosure will become better understood when the description is read with reference to the accompanying drawing, wherein:

FIG. 1 is the cross-sectional view the device for securing the blanket module to the fusion reactor vacuum vessel, according to the present invention

DETAILED DESCRIPTION

The device for securing the blanket module to the vacuum vessel of the fusion reactor has a flexible support 1 with flanges, a fastening member 2 and a displacement compensator positioned at the flange of the flexible support facing the blanket module 3, the displacement compensator comprising a supporting sleeve 4, a locking screw 5, a spacer sleeve 6 and a coupling sleeve 7 with a spherical protuberance. Flexible support 1 is made in the form of rods positioned between the two flanges. The flanges of the flexible support 1 are configured to have a male thread, and one of the flanges threadably couples the flexible support 1 to the vacuum vessel 8, and the other flange having a concave spherical end face couples the flexible support 1 to the blanket module 3 through the displacement compensator by means of the threaded fastening member 2 connected with a mounting socket of the blanket module 3. The threaded fastening member 2 is configured as a locknut with a male thread. The supporting sleeve 4 is installed in the mounting socket of the blanket module 3 and is rigidly fixed to the mounting socket with a side surface by means of a self-locking thread (a force fitting thread or a taper thread) or by means of a welded seam.

The locking screw 5 is threadably secured to the flange of the flexible support 1, which is oriented towards the blanket module 3, and forms a pivot connection with the supporting sleeve 4 having a concave spherical surface, for example, by means of a washer 9 having convex spherical surface complimentary to the concave surface of the supporting sleeve 4. The intermediate sleeve 6 has a convex spherical surface and concave spherical surface and forms a pivot connection with the flange of the flexible support 1 and with the spherical protuberance of the coupling sleeve 7, respectively. The spacer sleeve 6 is movably connected to the locking screw 5, for example by means of a splined joint and a pin 10. The coupling sleeve 7 is rigidly connected to a stop surface of the locknut 2, for example using a flexible locking ring 11 or a locking ring and a welded seam (not shown on the FIGURE).

Mounting process of the blanket module on the vacuum vessel of the fusion reactor according to the present invention is carried out as follows.

The flexible support 1 is inserted into the mounting socket of the vacuum vessel 8. Then the locknut 2 with the coupling sleeve 7, the locking screw 5 with the spacer sleeve 6 and the pin 10, the ball washer 9 and the supporting sleeve 4 are screwed until tight into the mounting socket of the blanket module 3. The supporting sleeve 4 is screwed into the blanket module 3 with the self-locking thread (for example, a force fitting thread or a taper thread) or is connected with a welded seam. In this way flexible supports 1 are installed in the vacuum vessel 8 in a number required for mounting the blanket module 3 in the vacuum vessel 8, for example, four flexible supports, and the corresponding number of fastening units is installed in the module 3. Then the blanket module 3 is put to the vacuum vessel 8. The locking screws 5 are screwed onto the threaded flanges of the flexible supports 1 via the spacer sleeves 6 having a mounting seat for an installation tool in the center part. The threaded connection of the locking screws 5 with the flanges of the flexible support 1 is tightened and locked by means of rotating the locknuts 2. Self-installation of the structural components is accomplished due to the pivot connections of the displacement compensator components with the flange of the flexible support 1, as well as due to the movable (splined) joint of the spacer sleeve 6 with the locking screw 5 and because of the coupling sleeve 7 sliding along the locknut 2. The components are thus installed in the position where angular displacement of the flexible support 1 axis is compensated relative to the axis of the mounting socket of the module 3 and the locknut 2, and the power supply circuit is simultaneously closed.

The device is operated as follows.

During the reactor operation process dynamic forces from plasma disruption act on the module. The flexible support 1 sustains external pressure load and external tensile load arising in the mounting point of the fastening device, wherein the load from the module 3 should be transmitted to the vacuum vessel 8 of the fusion reactor. The pressure load is transmitted from the module 3 to the support 1 through the locknut 2, the coupling sleeve 7 and the spacer sleeve 6. The tensile load is transmitted from the module 3 to the support 1 through the supporting sleeve 4, the ball washer 9 and the locking screw 5. The load is then transmitted from the flexible support 1 to the vacuum vessel 8 via the flange of the flexible support, which is surrounded by the locking screw 5 and by the spacer sleeve 6, and through the rods of the flexible support to the flange connected with the vacuum vessel 8.

The invention claimed is:

1. A device for securing a blanket module to a fusion reactor vacuum vessel, comprising:
   a flexible support in the form of rods that are mounted between an upper flange and a lower flange; and
   a displacement compensator threadably mounted on the upper flange of the flexible support, which is faced to the blanket module,
      wherein the displacement compensator comprises
         a locking screw and a supporting sleeve pivotally connected to each other and
         a coupling sleeve with a spherical protuberance,
      wherein the flexible support is coupled to the blanket module by the coupling sleeve through a threaded fastening member;
      wherein
         the threaded fastening member is a locknut with a male thread, and
         the upper flange of the flexible support faced to the blanket module has a concave spherical surface;
      wherein the displacement compensator
         is fixedly connected to the blanket module and
         is provided with a spacer sleeve
            movably connected to the locking screw and
            having a convex spherical surface and a concave spherical surface forming a pivot connection with the upper flange and with the spherical protuberance of the coupling sleeve,
            the coupling sleeve being fixedly connected to a stop surface of the locknut.

2. The device of claim 1, characterized in that the fixed connection of the displacement compensator with the blanket module is achieved by a self-locking threaded connection between a side surface of the supporting sleeve and the blanket module.

3. The device of claim 1, characterized in that the fixed connection of the displacement compensator with the blanket module is achieved by a welded seam between a side surface of the supporting sleeve to and the blanket module.

4. The device of claim 1, characterized in that the movable connection between the spacer sleeve and the locking screw is made as a splined joint.

5. The device of claim 1, characterized in that the fixed connection between the coupling sleeve and the stop surface of the locknut is made using a flexible fixing ring.

6. The device of claim 1, characterized in that the fixed connection between the coupling sleeve and the stop surface of the locknut is made using a fixing ring and a welded seam.

* * * * *

UNITED STATES PATENT AND TRADEMARK OFFICE
CERTIFICATE OF CORRECTION

| | | |
|---|---|---|
| PATENT NO. | : 10,593,433 B2 | |
| APPLICATION NO. | : 16/087027 | |
| DATED | : March 17, 2020 | |
| INVENTOR(S) | : Vladimir Ur'evich Kolganov, Sergey Emil'evich Khomyakov and Ivan Igorevich | |

It is certified that error appears in the above-identified patent and that said Letters Patent is hereby corrected as shown below:

In Column 1 under (73) Assignee:
"State Of Atomic Energy Corporation "Rosatom" On Behalf Of The Russian Federation (RU)"
Should be:
--State Atomic Energy Corporation "Rosatom" On Behalf Of The Russian Federation (RU)--

Signed and Sealed this
Twenty-third Day of February, 2021

Drew Hirshfeld
*Performing the Functions and Duties of the*
*Under Secretary of Commerce for Intellectual Property and*
*Director of the United States Patent and Trademark Office*